(12) United States Patent
Wilansky et al.

(10) Patent No.: US 8,984,021 B2
(45) Date of Patent: Mar. 17, 2015

(54) SYSTEM AND METHOD FOR HARVESTING ELECTRONICALLY STORED CONTENT BY CUSTODIAN

(75) Inventors: Ethan Wilansky, Annapolis, MD (US); Lawrence Briggi, Croton, NY (US); Tomek Stojecki, Miedzyrzecze Gorne (PL)

(73) Assignee: FTI Consulting, Inc., Annapolis, MD (US)

( * ) Notice: Subject to any disclaimer, the term of this patent is extended or adjusted under 35 U.S.C. 154(b) by 182 days.

(21) Appl. No.: 12/982,786

(22) Filed: Dec. 30, 2010

(65) Prior Publication Data

US 2012/0173506 A1    Jul. 5, 2012

(51) Int. Cl.
*G06F 17/30* (2006.01)
*G06F 3/00* (2006.01)
*G06F 21/62* (2013.01)
*G06Q 50/18* (2012.01)

(52) U.S. Cl.
CPC ...... *G06F 21/6218* (2013.01); *G06F 17/30011* (2013.01); *G06F 17/30699* (2013.01); *G06Q 50/18* (2013.01); *G06F 2221/2141* (2013.01)
USPC .......................................... 707/802; 715/764

(58) Field of Classification Search
CPC .................... G06F 17/30598; G06F 17/30011
See application file for complete search history.

(56) References Cited

U.S. PATENT DOCUMENTS

| | | | |
|---|---|---|---|
| 2001/0027451 | A1 | 10/2001 | Taguchi et al. |
| 2004/0111358 | A1* | 6/2004 | Lange et al. ..................... 705/37 |
| 2005/0187937 | A1 | 8/2005 | Kawabe et al. |
| 2007/0162417 | A1* | 7/2007 | Cozianu et al. .................. 707/1 |
| 2007/0233647 | A1 | 10/2007 | Rawat et al. |
| 2007/0271517 | A1* | 11/2007 | Finkelman et al. ........... 715/742 |
| 2008/0201318 | A1* | 8/2008 | McNew ............................ 707/5 |
| 2008/0222108 | A1 | 9/2008 | Prahlad et al. |
| 2009/0005010 | A1* | 1/2009 | Dote et al. ................. 455/412.1 |
| 2009/0031286 | A1* | 1/2009 | Yee et al. ....................... 717/120 |
| 2010/0250538 | A1* | 9/2010 | Richards et al. .............. 707/737 |
| 2010/0250644 | A1* | 9/2010 | Toomey et al. ............... 709/202 |
| 2011/0320411 | A1* | 12/2011 | Henderson .................... 707/687 |

FOREIGN PATENT DOCUMENTS

| | | |
|---|---|---|
| EP | 1406186 | 4/2004 |
| GB | 2352857 | 2/2001 |

* cited by examiner

*Primary Examiner* — Tarek Chbouki
(74) *Attorney, Agent, or Firm* — Patrick J. S. Inouye; Krista A. Wittman; Leonid Kisselev

(57) ABSTRACT

A system and method for harvesting electronically stored content by custodian is provided. Content associated with user names for one or more custodians is maintained in a collaboration environment. A custodian list with names of at least a portion of the custodians is received. Access reports each having user names and associated unique identifiers for the custodians with access to the content within a collaboration environment are obtained. One or more of the user names are mapped with at least one of the custodians by comparing the list of custodians to the access reports and by determining a selected user name for the at least one custodian. The content associated with the at least one custodian is identified using the selected user name.

18 Claims, 10 Drawing Sheets

Collection

| | |
|---|---|
| SharePoint Location | c:\Collection |
| AD Location | \\advertisement |
| SQL Server and DB Names | Alpha – Test1 |
| Collection Report Location | c:\SP_Collection_Location |
| Batch File Location | c:\Collection\SP_Batch_File_Location |

Process Collection

| Reports | DB | Last Run | Duration | | Reports | DB | Last Run | Duration |
|---|---|---|---|---|---|---|---|---|
| ≡ Active Directory Object Reports | | | | | ≡ SharePoint List Reports | | | |
| ☐ AD - All Users | ☐ | | | | ☐ SP - All Lists By User | ☐ | | |
| ☐ AD - All Groups | ☐ | | | | ☐ SP - All Lists By Windows Group | ☐ | | |
| | | | | | ☐ SP - All Lists By SP Group | ☐ | | |
| ≡ SharePoint Object Reports | | | | | ≡ SharePoint Web Reports | | | |
| ☐ SP - All Users | ☐ | | | | ☐ SP - All Webs By User | ☐ | | |
| ☐ SP - All Webs | ☐ | | | | ☐ SP - All Webs By Windows Group | ☐ | | |
| ☐ SP - All SP Groups | ☐ | | | | ☐ SP - All Webs By SP Group | ☐ | | |
| ☐ SP - All Role Definitions By Web | ☐ | | | | | | | |
| ≡ SharePoint File Content Reports | | | | | ≡ SharePoint Folder Reports | | | |
| ☐ SP - All Documents By User | ☐ | | | | ☐ SP - All Folders By User | ☐ | | |
| ☐ SP - All Documents By Windows Group | ☐ | | | | ☐ SP - All Folders By Windows Group | ☐ | | |
| ☐ SP - All Documents By SP Group | ☐ | | | | ☐ SP - All Folders By SP Group | ☐ | | |
| ≡ SharePoint All Documents | | | | | | | | |
| ☐ SP - All Documents | ☐ | | | | ☐ Select All/Clear All Report | | ☐ Select All/Clear All DB | |

[ Start ]  [ Main Menu ]  [ Close ]

Fig. 9.

Analysis

SQL Server and DB Names: Alpha ~ Test1
Load (Import) File Location: c:\SP_Collection_Location

Process Analysis

| Reports | Last Load | Record Cnt | Reports | Last Load | Record Cnt |
|---|---|---|---|---|---|
| Active Directory Object Reports | | | SharePoint List Reports | | |
| ☐ AD - All Users | 2/23/2010 3:15:11 PM | 48563 | ☐ SP - All Lists By User | 2/23/2010 3:15:11 PM | 2 |
| ☐ AD - All Groups | 2/23/2010 3:15:11 PM | 1000 | ☐ SP - All Lists By Windows Group | 2/23/2010 3:15:11 PM | 0 |
| | | | ☐ SP - All Lists By SP Group | 2/23/2010 3:15:11 PM | 1848 |
| SharePoint Object Reports | | | SharePoint Web Reports | | |
| ☐ SP - All Users | 2/23/2010 3:15:11 PM | 9896 | ☐ SP - All Webs By User | 2/23/2010 3:15:11 PM | 6 |
| ☐ SP - All Webs | 2/23/2010 3:15:11 PM | 744 | ☐ SP - All Webs By Windows Group | 2/23/2010 3:15:11 PM | 0 |
| ☐ SP - All SP Groups | 2/23/2010 3:15:11 PM | 6582 | ☐ SP - All Webs By SP Group | 2/23/2010 3:15:11 PM | 3355 |
| ☐ SP - All Role Definitions By Web | 2/23/2010 3:15:11 PM | 59021 | | | |
| SharePoint File Content Reports | | | SharePoint Folder Reports | | |
| ☐ SP - All Documents By User | 2/23/2010 3:15:11 PM | 0 | ☐ SP - All Folders By User | 2/23/2010 3:15:11 PM | 0 |
| ☐ SP - All Documents By Windows Group | 2/23/2010 3:15:11 PM | 0 | ☐ SP - All Folders By Windows Group | 2/23/2010 3:15:11 PM | 0 |
| ☐ SP - All Documents By SP Group | 2/23/2010 3:15:11 PM | 816 | ☐ SP - All Folders By SP Group | 2/23/2010 3:15:11 PM | 206 |
| SharePoint All Documents | | | | | |
| ☐ SP - All Documents | 2/23/2010 3:15:11 PM | 133991 | ☐ Select All/Clear All | | |
| | | | ☑ Finished Normalization | | |

[Load]  [Normalize]

Summary Report

Client Name: Test1

[Select Folder Location]  [View Result]  [Main Menu]  [Close]

[Docs Accessible by Custodian]  [Docs Authored]  [Docs Modified]  [Docs Type]  [Docs Web Site]  [Browse]

Fig. 10.
130

☐ Custodian Name Normalize    ☒

File Name: C:\Documents\App_Sharepoint_Collection\Import Custodian List.txt    [Browse]

[Import List] 131, 132, 133, 134, 135, 136

| CustodianName | Match | IsNoMatch | Sure/UN | Selection |
|---|---|---|---|---|
| Tom Bernad | Tom Bernad | ☐ | | |
| William Smith | | ☐ | Bill Smith, WA Smith | BIlls Smith |
| Peter Amenda | | ☐ | PAmenda | PAmenda |
| Evans Kent | Evans Kent | ☐ | | |
| Bryan Park | | ☑ | BPark | BPark |
| John Fooster | | ☐ | John Fooster | |
| Rob Wendy | Rob Wendy | ☐ | | |
| Amy Bashi | Amy Bashi | ☐ | | |
| Eddie Brown | Eddie Brown | ☐ | | |
| Dave Dale | Dave Dale | ☐ | | |
| Ed Roland | | ☐ | Mac Roland.ERol... | ERoland |
| JMayer | | ☑ | | |
| Jane Cruz | | ☑ | | |
| Janis Alba | | ☑ | Jessica Alba | |

[Export List]    [Main Menu]

137

SYSTEM AND METHOD FOR HARVESTING ELECTRONICALLY STORED CONTENT BY CUSTODIAN

FIELD

This application relates in general to conducting content searches and, in particular, to a system and method for harvesting electronically stored content by custodian.

BACKGROUND

Currently, there is a widespread increase in the storage and maintenance of electronic content. Electronic content can include structured or unstructured content, such as text files, images, and emails, as well as other types of documents. In a collaborative environment, electronic content can be centrally stored and accessed by multiple users for reference, modification, or analysis. Further, the users can add content to the collaborative environment for sharing with other users, which causes an influx of electronic content within the environment. Additionally, the collaborative environment is constantly changing due to the addition, modification, and deletion of electronic content.

The constantly changing nature of a collaborative environment can hinder or make difficult, content searches. For, example, accurate and consistent search results are necessary during the discovery portion of litigation to identify documents potentially relevant to the underlying legal matter for review, which can potentially affect the outcome of the underlying legal matter. However, as the number of electronic documents to be searched increases, the time for conducting the search also increases, while the search accuracy decreases.

Products, such as Microsoft SharePoint, licensed by Microsoft Corporation, Redmond, Wash. provide a collaborative user environment with search functionality and access control. Yet, particular versions of the SharePoint search tools can be inadequate for providing efficient, accurate, and consistent results during the discovery phase of litigation due to the complex security, dynamic nature of the environment, and inconsistent indexing of the electronic documents.

Attempts have been made to accurately obtain documents from within SharePoint. For example, Stored IQ, Kazeon, Autonomy, and AvePoint all conduct document searches in SharePoint using a keyword query. Stored IQ, Autonomy, and Kazeon generate external indexes by reindexing all the documents in SharePoint, while AvePoint solely relies on the index of SharePoint. Keywords are then applied to the SharePoint index or newly generated index to identify stored electronic documents that contain the keywords and phrases. However, keyword searches can be inaccurate and untimely. To perform a keyword search, search terms must first be identified, which can be time consuming and delay the document search. In addition, the results of keyword searches need to be evaluated and tested to validate the use of those particular keywords.

Thus, there remains a need for a system and method for accurately and timely conducting a document search by custodian within a collaboration platform having stored electronic documents and preserving the identified documents.

SUMMARY

A system and method for harvesting electronically stored documents by custodian is provided. A list of custodians is received. Access reports, each including user names and associated unique identifiers for the custodians with access to documents within a collaboration environment are obtained. One or more of the user names are mapped to at least one of the custodians by comparing the list of custodians to the access reports. At least one of the custodian name and the unique identifier are compared with the access reports. Documents within the collaboration environment that are associated with at least one custodian are identified based on the comparison.

A further embodiment provides a system and method for harvesting content by custodian. Content associated with user names for one or more custodians is maintained in a collaboration environment. A custodian list with names of at least a portion of the custodians is received. Access reports each having user names and associated unique identifiers for the custodians with access to the content within the collaboration environment are obtained. One or more of the user names are mapped to at least one of the custodians by comparing the list of custodians to the access reports and by determining a selected user name for the at least one custodian. The content associated with the at least one custodian is identified using the selected user name.

An even further embodiment provides a system and method for identifying documents by custodian. A collaboration environment of documents is accessed. Collection data including access lists with one or more of user names, unique custodian identifiers, and group identifiers is obtained. At least one of the user name and unique custodian identifier is determined for at least one custodian by comparing a name of the custodian with the collection data. Groups to which the custodian belongs are identified using at least one of the user name and unique custodian identifier. A unique group identifier is determined for each group. At least one of the user name, unique custodian identifier, and unique group identifier are applied to the collaboration environment to identify the documents associated with the custodian. Selection criteria are applied to the identified documents and those documents that satisfy the criteria are selected. The selected documents are exported outside of the collaboration environment.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 8 is a screenshot showing, by way of example, an interface for gathering content and user information.

FIG. 9 is a screenshot showing, by way of example, an interface for loading the content and user information of FIG. 8.

FIG. 10 is a screenshot showing, by way of example, an interface for displaying normalization results for custodian names.

DETAILED DESCRIPTION

As the volume of electronically stored content increases, accurate and timely methods for conducting content searches are crucial. A content search by custodian underlies the need for determining appropriate search terms, which allows the search to be conducted prior to a thorough analysis of a case and avoids missing content, such as documents, based on unselected keywords. In a dynamic environment, such as SharePoint, originally missed documents can undergo changes, replacement, and even deletion during the additional time needed to determine and test keywords. Such delays can result in spoliation of data, which can negatively affect a legal case or proceeding.

Custodians can access a collaboration environment within which electronic content is stored either by individual custodian or though group membership. Within the collaboration environment, content access and content histories are recorded using user names for the custodians and associated unique user identifiers. To perform a content search by custodian, the user name and unique user identifier must be identified for that individual custodian. In addition, all groups to which a custodian is a member should be identified, as well as the group's unique identifier. The collaborative environment, such as SharePoint, utilizes the user and group identifiers to implement security and thus, provide access to data. Once the identifiers are identified, a search for electronic content associated with that custodian is conducted using the user name, unique user identifier, and the unique group identifiers for the groups to which the custodian belongs.

Figure 1:
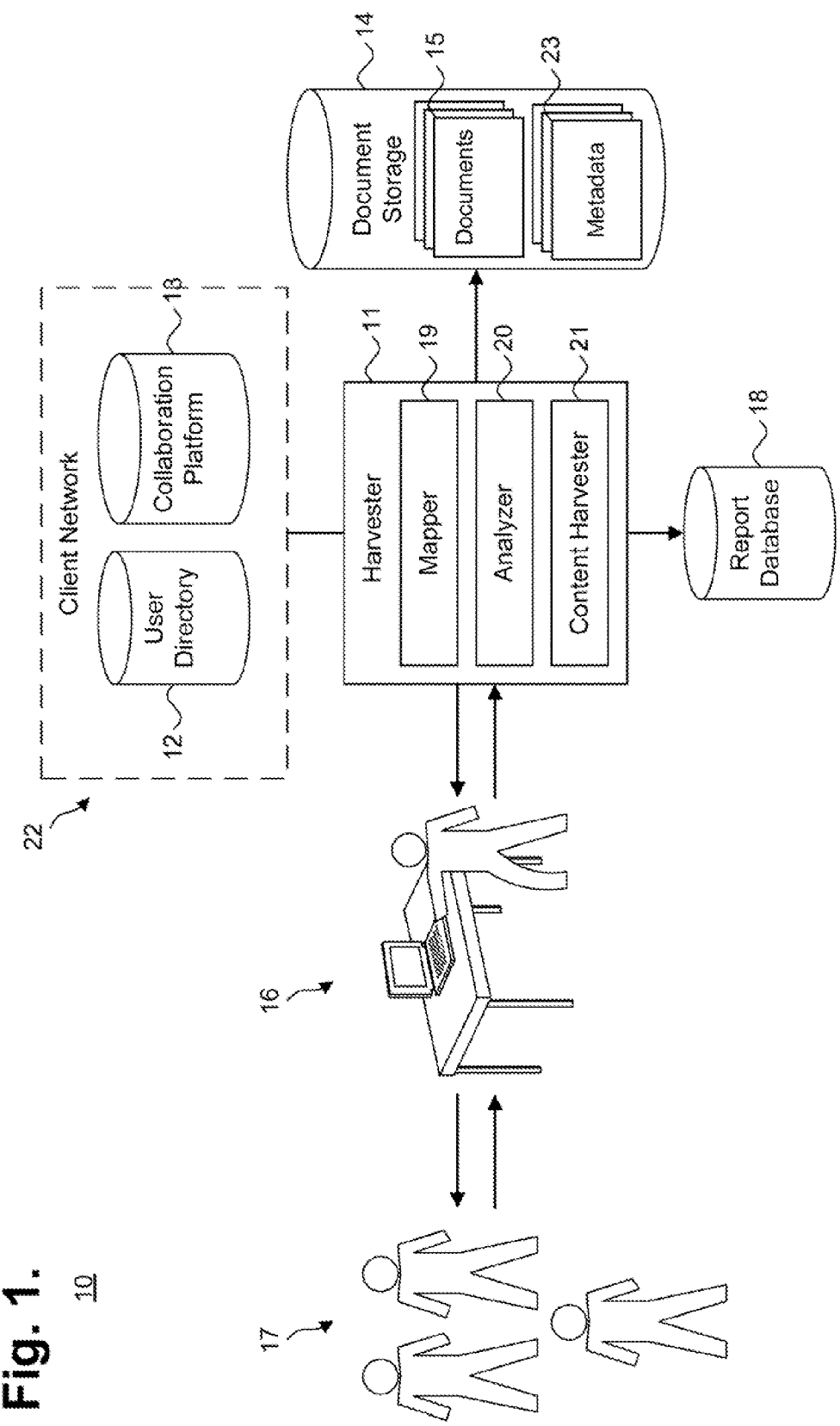
FIG. 1 is a block diagram showing a system for harvesting electronically stored content by custodian, in accordance with one embodiment.

Content searching by custodian requires a support environment within which custodian name mapping and content harvesting can be performed. FIG. 1 is a block diagram showing a system 10 for harvesting electronically stored content by custodian, in accordance with one embodiment. By way of illustration, the system 10 operates in a distributed computing environment, which includes a plurality of heterogeneous systems. The system 10 includes a harvester 11, which executes a software suite for providing document management, processing, and analysis. The software suite includes a mapper 19, system analyzer 20, and document harvester 21. The harvester 11 can be coupled to a client network 22, through a direct physical connection, remotely using batch commands, or remotely using a copy of the client's environment.

The client network 22 is maintained by a client user of the harvesting system, such as a business client or a representative of the client 17. The business client can be an individual, business entity, or group that is interested in identifying particular content within the network 22. In one embodiment, the client is a business entity that is interested in identifying relevant documents for document review during the discovery stage of a lawsuit or investigation. The client or client representative can consult with an optional search coordinator 16, who assists with the document harvest by facilitating the exchange of data between the harvester 11 and the client 17. The content can include structured content, such as metadata within a collaborative environment, or unstructured content, including text files, images, and other types of documents. The discussion below focuses on documents; however, other types of content are also possible.

The client network 22 can include a collaboration platform 13 and a user directory 12. The collaboration platform 13 is a collaborative content management system for adding, maintaining, revising, deleting, and sharing electronic content, such as documents. More specifically, the collaboration platform 13 tracks custodian actions and maintains a history of each document. A custodian is an individual for which a request to identify related documents is made. The document history can include a document disposition and the custodian that requested the disposition. In the history, a user name or unique user identifier can identify the custodian. The collaboration platform maintains the tracked information in collaborative access reports.

In one embodiment, the collaboration platform is SharePoint, licensed by Microsoft Corporation, Redmond, Wash. Other software platforms and programs can be used. At a minimum, the collaboration platform should include a database (not shown) for storing electronic documents and should maintain a history of each electronic document based on custodian, such as who created the documents and who has access to the documents.

The user names each represent a particular custodian with access to the collaborative platform and can include a login. However, other user names are possible, such as a password or pass code. Additionally, the user name and user identification are used to track the custodian's actions with respect to the documents. Meanwhile, the user identifiers can each include a global uniform identifier ("GUIDs"), which is a unique reference value that is commonly represented by a hexadecimal string of 32 characters. However, other GUID formats, such as 128 bit integers, and other types of identifiers are possible.

The collaborative platform 13 is interconnected with the user directory 12, which is a security protocol that is built into a network operating system, within, which the collaborative platform runs. In one embodiment, the user directory 12 can be Active Directory, which is licensed by Microsoft Corporation, Redmond, Wash. However, other types of directories are possible. The user directory 12 can maintain user profiles, including the user names and unique identifiers, for custodians having access to the collaborative platform. The user directory can receive requests for and provide directory access reports, which can include lists of users, lists of groups, and combinations of the lists, as well as other lists. The directory access reports can be stored in a database 18 external to the client network, such as a SQL database, and compared with a custodian list to match custodian names with user names.

Data from the client network 22 is requested and received by the harvester 11 for processing. More specifically, the collaboration access reports and directory access reports can be requested from the collaboration platform and user directory, respectively, for loading as collection files into the report database 18 and analysis. In one embodiment, two requests are sent to the user directory, while seventeen requests are sent to the collaboration platform. Requesting collection files is further discussed below with reference to FIGS. 8 and 9. The analysis includes generating collection files, such as a list of all documents by user. The collection files include information about objects, but not limited to, site, Web, list, folder, and file objects. Each object is associated with a GUID and access lists are applied to object reports generated during analysis. For example, the mapper 19 compares the custodian list with one of the collection files that lists user names to identify the correct user name for the listed custodian. The same or different user collection file can identify the unique user identifier associated with the correct user name. Mapping custodian names is further discussed below with reference to FIG. 3. The system analyzer 20 can use the user name or unique identifier to determine documents associated with the corresponding custodian. Identifying documents is further discussed below with reference to FIG. 5. The determined documents 15 are then located, identified within the collaboration environment, and exported or harvested out of the collaboration platform 13 for storage in and preservation on media protected from user access and changes, such as document storage 14. Obtaining the identified documents 15 is further discussed below with reference to FIG. 7. Metadata 23 about the identified documents 15, which can be included in the collection files, is also copied for preservation. The external document storage 14 can be the same as, or different from, the external report database 18.

The system 10 includes individual computer systems, such as the harvester 11, collaborative platform 13 and user directory 12. The individual computer systems are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. The various implementations of the source code and object and byte codes can be held on a computer-readable storage medium, such as a floppy disk, hard drive, digital video disk (DVD), random access memory (RAM), read-only memory (ROM) and similar storage mediums. For example, program code, including software programs, and data are loaded into the RAM for execution and processing by the CPU and results are generated for display, output, transmittal, or storage.

Figure 2:
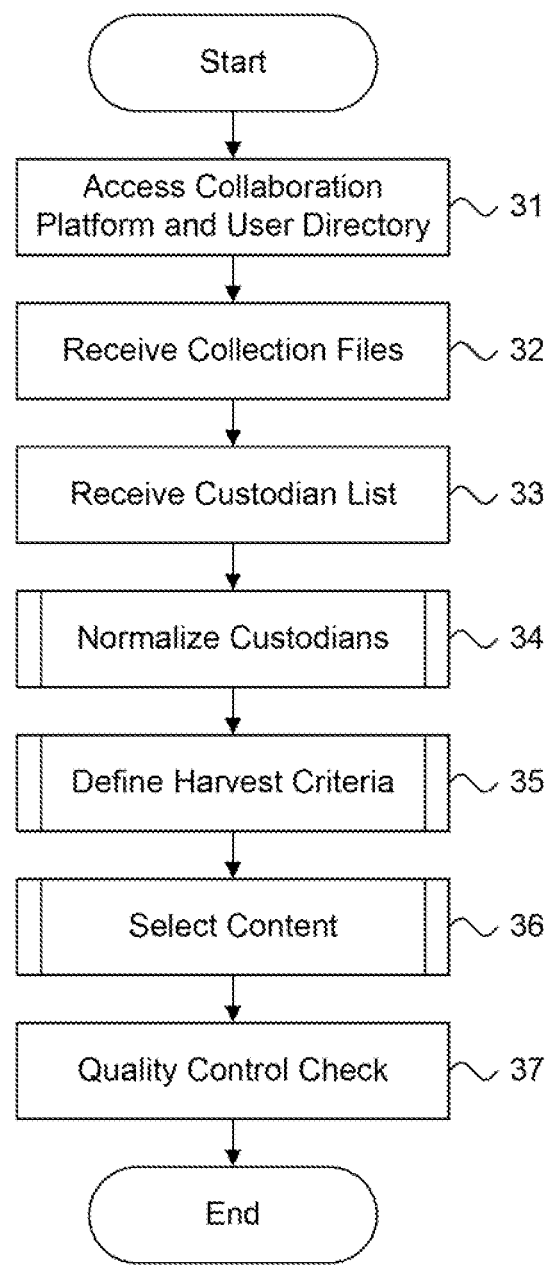
FIG. 2 is a flow diagram showing a method for harvesting electronically stored content by custodian, in accordance with one embodiment.

The harvesting of documents by custodian allows a search to be conducted more expeditiously than when performed by keyword search, as keywords need not be determined and tested. Early performance of the document search allows the client additional time to define further selection criteria and perform document reviews, if involved in a lawsuit. Also, the documents identified during the search can be formatted for further analysis, including document review. FIG. 2 is a flow diagram showing a method for harvesting electronically stored content by custodian, in accordance with one embodiment. During a document harvest, one or more documents that match specified criteria are identified within a client network and selected for external storage. Access to the client network, including the collaborative platform and user directory is obtained (block 31). In one embodiment, a consultant can obtain direct access to the client network by logging in using credentials provided by the client. However, in a further embodiment, the consultant can remotely access the client's network by batching commands, which are transmitted to the client for execution within the network. In yet a further embodiment, the client can provide copies of their environment, which would be used instead of the "live" environment.

Collection files are requested and received (block 32) from each of the collaborative platform and user directory. The collection files can include information regarding all users, all groups, all Webs, all role definitions, all documents by user, all documents by group, all lists by user, all lists by group, all Webs by user, all Webs by group, all folders by user, and all folders by group. Each file can include fielded data that relates to specific information requested. For example, the all Webs collection file can include the following fields: Object ID (a GUID for the Website), Object Parent ID (the GUID for the site), Object Type (Web), Object URL, Object title, Object Created Date, Object Owner, and Object Secondary Owner. Other fields are possible.

Further, the collection files received from the collaboration platform each list documents, lists, Websites, or folders that are associated with data in the collaboration platform, as well as user information. Meanwhile, the collection files received from the user directory each list user names, group names, and unique identifiers. Other requests are possible.

Once received, the collection files are then stored in a report database, which can be located external to the client network. In the collection files, all custodians and groups having access to the collaborative platform are represented by a user name, which is associated with a unique user identification, such as a GUID. The user name can be automatically generated or generated by the client, custodian, or third party. Each user name can include full or partial components of a custodian name, while the group names can include an arbitrary name or a representation of the group. Often times, the user name can be used as the custodian's login information to the collaborative platform.

The data in the collection files can be interrelated to identify key information associated with a custodian. For example, properly identifying a custodian by their logon name can be accomplished using the "All Users" and "All Groups" collection files. Detailed user information, including group membership, is contained in the "All Users" collection file and detailed information about each group is contained in the "All Groups" collection file. By combining these two sources, a custodian can be identified by his group membership even if his logon name doesn't match his full name. Other examples of identifying information using a combination of the collection files are possible, including identifying custodian Website access and document authorship.

Additionally, a list of custodian names is received (block 33) from a party, such as the client or the client's counsel. Each name represents a custodian affiliated with the client and can include the custodian's full name, legal name, partial name, or nickname. Component of the custodian name can include a first, middle, and last name of each custodian. In one embodiment, information about the custodian's employment, such as start date and separation date, or other information can be included with the custodian name. The names can each be listed in a format, including first name first or surname first. Further, abbreviations can be used, such as for the middle name. Other name components and formats are possible. The custodian list is compared with at least one of the collection files, which includes the user names, to identify the user name that represents that custodian within the collaboration platform, during a normalization stage (block 34). Results of the comparison include identical and partial matches, suggestions, or no matches for each custodian.

An identical match is identified when the user name is an exact match to the custodian name. A partial match is identified when at least one naming component, such as a last name of the custodian name matches the user name. Also, one or more user name options can be provided as partial matches. The user name options for the custodians can be provided to the client user for further review and selection. A user name suggestion is automatically provided when one of the user name options satisfies a particular threshold of confidence, while the options are provided when there is not enough information to provide a user name as a suggestion. The results are then provided to the client or the client's representative for further review. The client can review and select one of the options as the user name. Mapping the custodian list with the collected data is further described below with reference to FIGS. 3 and 10.

Once the correct user name is identified for a particular custodian, the associated unique identifier is determined (block 34). Upon identification, harvest criteria is generated to export documents associated with that custodian (block 35). Identifying custodians and documents is further described below in detail with reference to FIGS. 4 and 5.

The criteria can include selecting one or more custodians, a particular file extension, documents accessed by or authored by a particular custodian, and web sites. Other criteria are possible, including list, site, and folder criteria. The criteria are applied to the identified documents that are associated with one or more custodians. Defining harvest criteria is further described below with reference to FIGS. 6 and 11. A list of the documents matching the criteria is generated and applied in the collaboration environment during harvesting to identify and select those documents on the list for further use (block 36). Copies of the documents listed are exported from the client network to an external storage device for storage, preservation, and further analysis. Harvesting documents is further discussed below with reference to FIG. 7. Post-harvest, a quality control check (block 37) can be executed to ensure that all listed documents were copied and exported. As well, the exported documents can be formatted for use in a further analysis.

Figure 3:
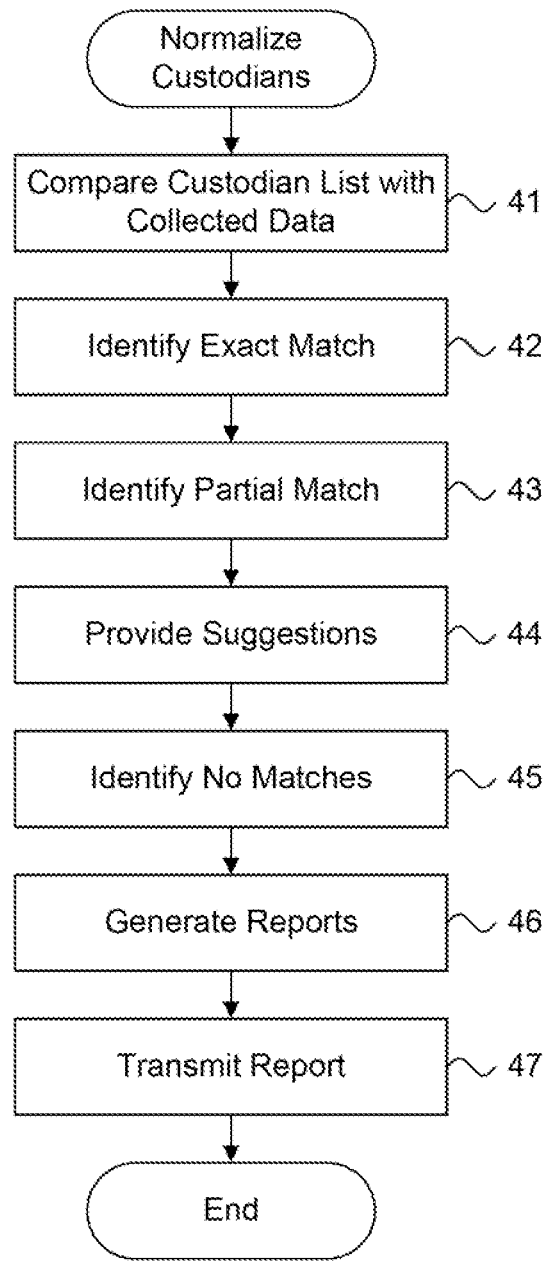
FIG. 3 is a flow diagram showing, by way of example, a method for normalizing a custodian list.

Conventionally, identifying documents associated with a custodian can be challenging since collaboration platforms often identify custodians by user name and unique user identifiers, rather than by a name of the custodian. FIG. 3 is a flow diagram showing, by way of example, a method 40 for mapping a list of custodians with the collection files. The custodian list includes the names of each custodian and is compared (block 41) with data from the collection files from the collaboration platform and user directory. Exact matches are identified (block 42). The exact matches can include a full name of the custodian, a full first and last name with an abbreviated middle name, or only a first and last name. Other combinations of full names are possible. If an exact match is not identified, a component of the custodian name can be used, such as the surname, to query the documents and identify user names that share a common component for a partial match (block 43). The partial matches can be based on one or more matching name components, such as first name, middle name, surname, or initial. Additionally, a combination of the components can be used.

One or more partial matching user names can be provided as options. The user name option having the closest similarity to a particular custodian name can be automatically selected and provided as a suggestion (block 44). In one embodiment, the option may only be selected when a predetermined confidence threshold is satisfied. The suggestion can be provided with or separate from the user name options. When provided, the options and suggestions can be transmitted for further review by the client. Further, if no matches or reasonable possibilities can be identified, a determination of no matches is generated (block 45). For example, if no user names with a matching surname or other matching name component are located as partial or exact results, an indication is generated that no match was found (block 45). A mapping report, including the exact matches, partial matches, options, suggestions, and no matches is generated (block 46) for documentation and a copy is provided (block 47) to the client or client's counsel for manual review, research, and confirmation. Generation of the mapping report is further discussed below with reference to FIG. 10.

During manual review, the client can determine, for example, which user name option provided in the report correctly identifies the associated custodian. For instance, the name William D. Smith is provided in a custodian list. However, the mapping reports only include user names of Bill Smith and William Smith. Both options are provided to the client in a report and the client can determine whether one of the options correctly represents the custodian "William D. Smith." Alternatively, the user name, "William Smith" can be automatically provided as a suggestion since the first and last name of the custodian name "William D. Smith" match the user name. Whereas, the custodian name only has one matching name component with the user name "Bill Smith." Additionally, the client can determine reasons why no match was identified, such as the custodian is listed in the custodian list by married name, rather than maiden name, which was used, for example, when joining the company and the user identification was generated in the electronic storage environment. Thus, a custodian may be listed with a married surname, while associated with a user name that is based on a maiden surname. Further, the custodian may no longer be employed or associated with the client and may have been removed from the user directory in the client network. Alternatively, the user name and unique identifier may still remain in the collaborative platform, but if the user account no longer exists in the user directory, a match with the custodian name may not be made.

Figure 4:
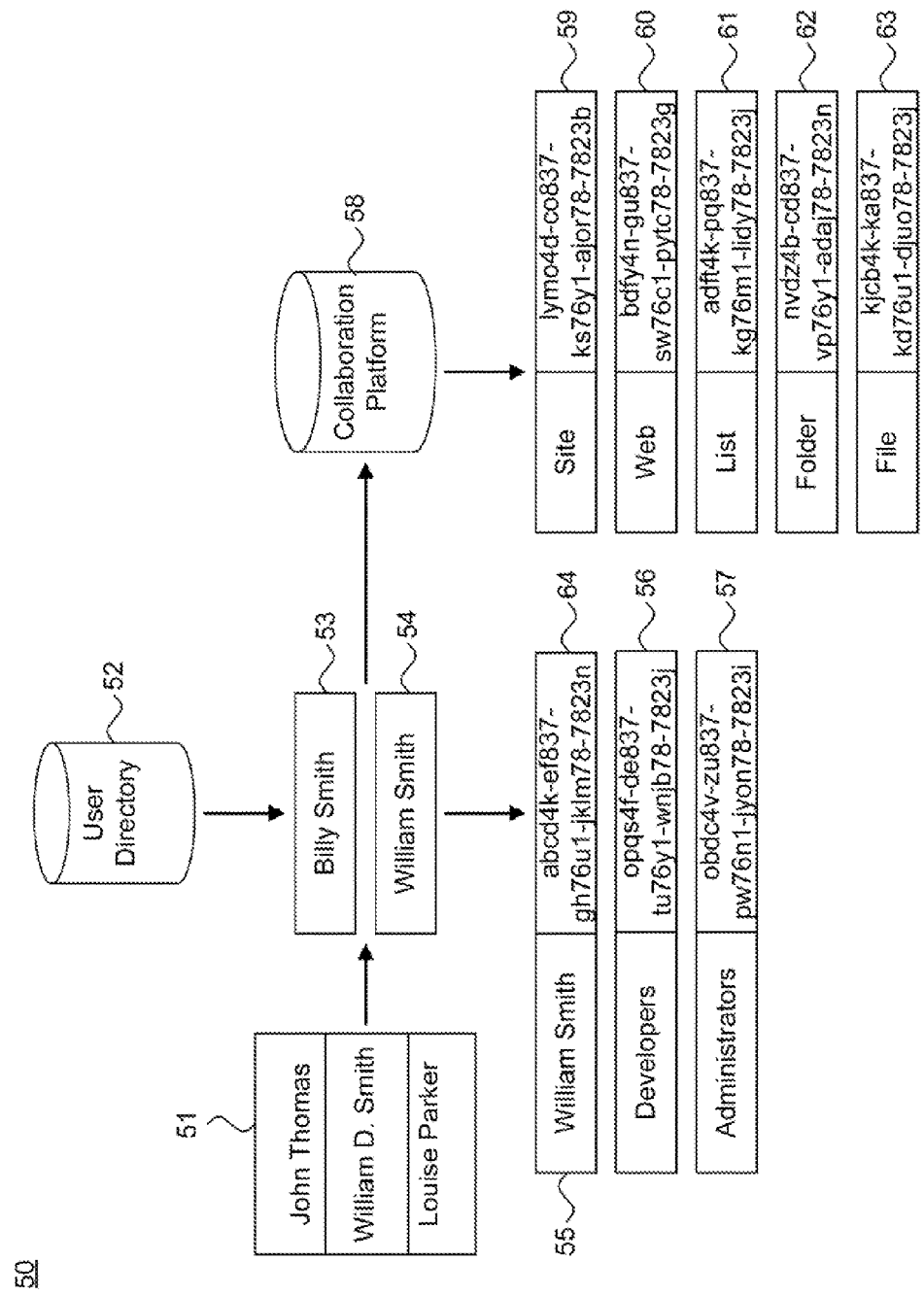
FIG. 4 is a block diagram showing, by way of example, a system for determining a unique user identifier.

The actions of each custodian are tracked in the collaborative environment by a unique user identifier associated with the user name for that custodian. To identify content associated with the custodian, the unique user identifier for that custodian must be determined. FIG. 4 is a block diagram, showing by way of example, a system 50 for obtaining a unique user identifier 64. A custodian list 51 is compared with user names 53, 54 provided in one or more collection files. The collection files can be obtained from the collaborative platform 58 and from the user directory 52. After identifying a correct user name 55, the corresponding user identifier 64 is determined. As described above, collaboration platforms often track user actions and document dispositions by user name or unique user identifier, such as a GUID. Other identifiers are possible. In one embodiment, document access records are maintained and stored using the unique user identifiers, while, document authorship records are maintained, recorded, and stored using user names. Accordingly, multiple analytical processes must be performed to identify all documents associated with the custodian. In one embodiment, the document searches are performed using at least one of the user name, unique user identifier, and one or more unique group identifiers. Other variations are possible.

To identify unique group identifiers for groups to which the custodians belong, the unique user identifier for the custodian is run through the collaborative platform to determine the groups. Each group is associated with its own unique identifier, such as a GUID (56, 57), which can be used to identify documents in the collaborative platform that are associated with that particular group and custodian.

Additionally, the collaborative environment can maintain objects, including Site 59, Web 60, List 61, Folder 62, and File 63, which must be traversed to conduct a content search by custodian. Once traversed, the objects can be used to generate reports from the collection files, such as to identify a custodian's access to content. For example, the reports can identify documents associated with a particular file extension, access permission, Websites, and groups associated with the custodian. Once generated, the reports can be used to select documents for harvesting. Other objects are possible.

The Site object 59 allows a custodian to access information on all Webs within the site collection where permissions are inherited. The Web object 60 allows a custodian to access information on a specific Web in a collaboration environment, such as a SharePoint site collection. The List object 61 allows a custodian to access documents stored in lists on the collaboration platform 13. The Folder object 62 allows a custodian to access documents stored in folders within a collaboration environment list, while the File object 63 allows a custodian to access at least one document stored within a document library or as an attachment in a collaborative environment list.

Each object is associated with a unique identifier, such as a GUID. Discretionary access control lists are applied to these objects to ensure security of the objects. For example, access to content associated with a particular object can be granted when a custodian is identified as belonging to the access control list for that object. In addition, functionality is controlled by the type of access a custodian may have. For example, "read only" access allows the custodian to view the document, whereas, "modification" access allows the user to change the document. The objects are traversed using access rules established by the collaboration platform.

Each document in the collaboration platform is associated with a history that records metadata regarding the document, including author, creation date, custodian access, custodian modifications, and modification dates. Other metadata is possible, including access dates. User names or unique user identifiers can represent the custodians listed in a document history. Other custodian representations are possible. In one embodiment, custodian authors are represented by user name, while custodian access and modifications are represented by the unique identifiers.

Figure 5:
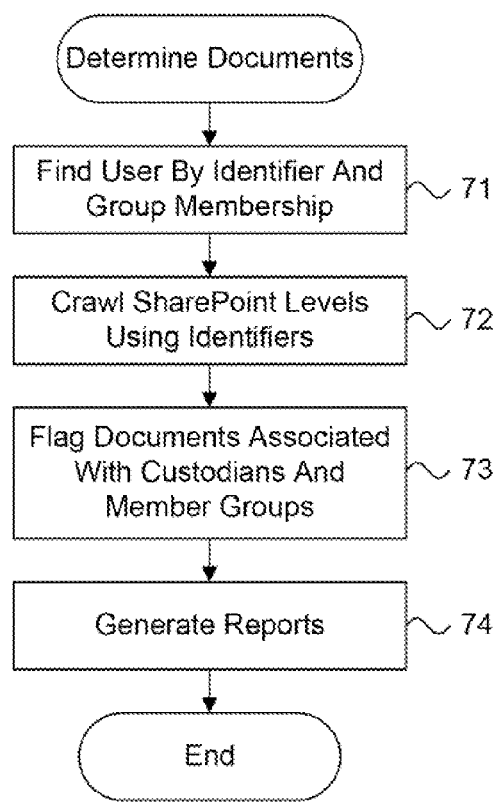
FIG. 5 is a flow diagram showing, by way of example, a method for identifying content based on a unique user identifier.

To determine documents associated with a particular custodian, the custodian's user identification is applied to the document metadata. FIG. 5 is a flow diagram showing, by way of example, a method for determining documents based on the unique user identifier. The unique user identifier for a custodian is obtained and applied to a collection file obtained from the user directory, such as the "all user" file, to identify groups in which the custodian is a member. The unique identifiers associated with each member group are identified (block 71). Information, such as the unique identifiers for both the custodian and the member groups, as well as the user name, are used to traverse the collaboration platform objects (block 72), which is described above in detail with reference to FIG. 4. Once the objects are traversed, content associated with the custodian and the custodian's member groups are flagged (block 73) and a report of the flagged documents is generated (block 74).

Figure 6:
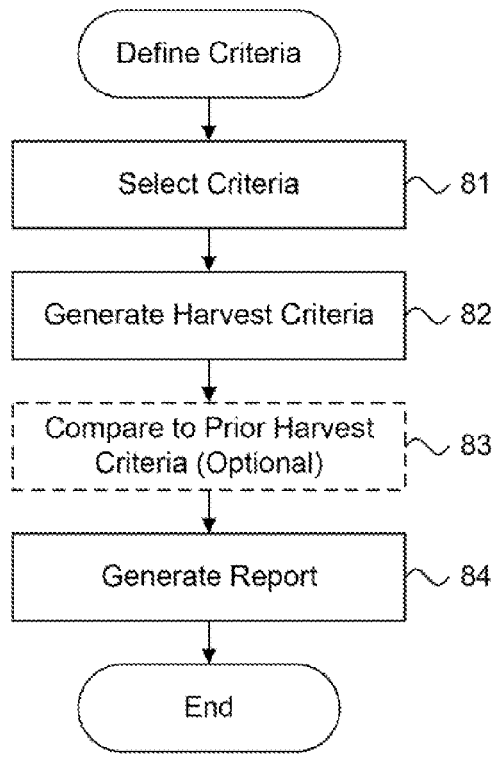
FIG. 6 is a flow diagram showing, by way of example, a method for defining harvesting criteria.

Defining criteria for the document harvest can further refine the documents identified by custodian. FIG. 6 is a flow diagram showing, by way of example, a method for defining harvesting criteria. Criteria, such as custodian, document disposition, file extension, and Website can be selected by a user, the client, the client's representative, or another party (block 81). Other criteria are possible. Alternatively, the criteria can be predetermined, such as from a previous document harvest. Once selected, the criteria can be used to generate a query (block 82), such as a SQL query for conducting a search for content determined to be associated with at least one custodian, as described above with reference to FIG. 5. The selected criteria can be compared (block 83) against criteria from a previous content harvest to identify content already harvested. For example, previously selected criteria include custodians "John Thomas," "Bob Jones," and "Tom Davis."

The newly selected criteria include "John Thomas," "Bob Jones," "Tom Davis," and "Sally Freeman." Since a content harvest was already performed for "John Thomas," "Bob Jones," and "Tom Davis," a harvest for "Sally Freeman" only need be performed. In a further embodiment, content from one or more harvests can be compared to identify duplicate content, which can be removed from the result set to prevent harvesting of content previously harvested. The results of any content matching the criteria can be provided to the client in a report (block 84) prior to harvesting. The report can list the content, such as documents, by name or identifier, such as numbers, letters, or symbols. Other listing conventions for the documents are possible.

Figure 7:
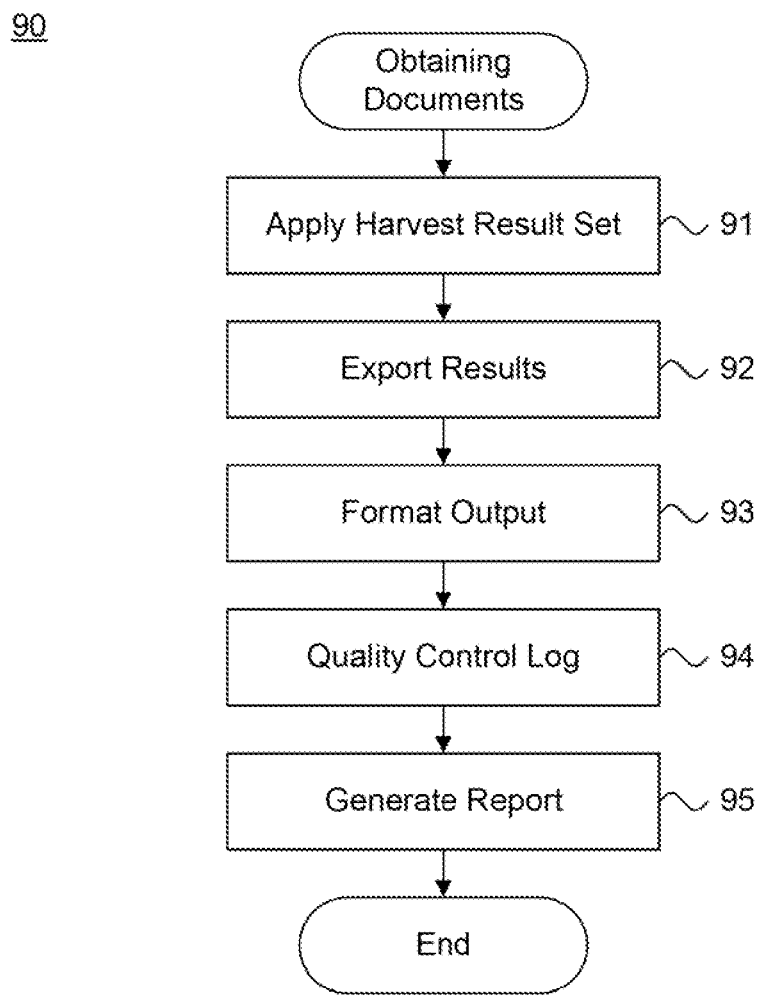
FIG. 7 is a flow diagram showing, by way of example, a method for obtaining content during the content harvest of FIG. 2.

The list of content that satisfies the harvesting criteria can then be used as a guide for identifying, copying, and exporting the actual content from the collaboration platform. FIG. 7 is a flow diagram showing, by way of example, a method for obtaining content during the content harvest of FIG. 2. A list of the documents identified as results of the criteria search is generated and applied to the documents of the collaboration platform (block 91). The documents recorded in the list are identified and harvested, and the copies are exported (block 92) to a data storage device located externally to the collaborative platform. The external data storage device can also be located external to or within the client network. The external data storage device can include a hard drive, as well as other types of data storage devices. The exported documents can be formatted (block 93) for further analysis, such as document review, data analysis, or other processes. A quality control log of all the documents recorded in the results list is generated (block 94) and applied to the external data storage to ensure that all documents have been exported or have been identified as failing to export. If all documents have been retrieved, no further harvester action is required and the exported documents can be stored, analyzed, or further manipulated. Otherwise, if one or more documents were not successfully retrieved and exported, the quality control log will identify the missing documents and address the problem, such as by recommending a further search for the documents. For example, the missing documents can be identified by providing a mechanism for the harvester engine to be re-run. The same criteria from the first harvest can be used and any results can be compared to the results from the first harvest to identify the missing documents. Other methods to address the problem are possible. After exporting all the documents that satisfy the harvest criteria, a report of the exported documents is generated (block 95) for sending to the client for review.

In a further embodiment, subsets of the exported documents can be generated to establish a document hierarchy. For example, an export document list is generated based on 50 selected custodians. A large volume of documents are identified and exported in a single pass harvest. Reviewing all the exported documents is time consuming and thus, the documents can be grouped to identify those documents most relevant. Continuing with the example, documents associated with particular custodians in the research and development team, the Chief Executive Officer, and the Chief Operating Officer are considered to be highly relevant, whereas documents associated with the legal staff and research assistants are considered less relevant. Accordingly, the exported documents can be divided into two groups to identify the extremely relevant documents and the less relevant documents. Alternatively, in a further embodiment, a separate search can be conducted for each custodian. Other types of hierarchies are possible.

During content harvesting, information received from the client or consultant, such as the file requests, mapping report, and harvesting criteria can be provided through a user interface. FIG. 8 is a screenshot 100 showing, by way of example, an interface 101 for gathering content and custodian information. A data box 102 is located at the top of the interface 101. The data box 102 includes fields for the collaboration platform location, such as SharePoint location; user directory location, including Active Directory location; SQL server and database names; collection report location; and batch file location. Batch file location identifies the location of commands remotely generated by the consultant and transmitted to the client for execution within the collaboration platform and user directory. A file box 103 is located below the data box 102. The file box 103 displays a list of collection files, including for example, two files from the user directory and seventeen files from the collaboration platform. Other numbers of files are possible. File characteristics are located adjacent to each listed file and can include last run and duration. The last run field indicates a date or time during which the file was requested and subsequently provided. The request can be indicated in a check box located on a left side of the listed file. Each file request is based on the entire contents of the user directory and the collaboration platform, including document histories, access records, custodian lists, and group lists. The duration field indicates the time required to obtain the requested file upon the most recent gathering of content from the user directory and collaboration platform. The DB check box facilitates loading the files upon receipt, rather than waiting until all files are received. This adds to task efficiency and reduces client user activity.

The user directory files can include "all users" and "all groups" files. The collaboration platform reports can include reports for "All Users," "All Webs," "All Documents," "All SharePoint Groups," "Role Definitions by Web," "All Documents by User," "All Documents by Windows Group," "All Documents by SharePoint Group," "All Lists by User," "All Lists by Windows Group," "All Lists by SharePoint Group," "All Webs by User," "All Webs by Windows Group," "All Webs by SharePoint Group," "All Folders by User," "All Folders by Windows Group," and "All Folders by SharePoint Group." Each file provides a subset of data that is directed to information related to the title of the file, as described above with reference to FIG. 2. The files can be linked together in the external data storage, such as an SQL database. Client user selection buttons are located at the bottom of the page and include a start button, main menu button, and close button. Selection of the start button submits the request for selected reports. In a further embodiment, if the collaborative platform is remote, the interface can include a generate batch button to facilitate batch commands, rather than immediately initiating report requests.

The returned collection files provide a number of records associated with each file. FIG. 9 is a screenshot, showing by way of example, an interface 111 for loading the document and user information of FIG. 8. The interface 111 is provided once the requests for user reports have been executed, as described above with reference to FIG. 8. A data box 112 is located at the top of the interface 111 and includes fields for server and database names, and import file location. A file box 113 is located below the data box 112 and includes the 19 files described above with reference to FIG. 8. Each file is associated with two fields, including a last load field and a record count field. The data in the last load field is updated with the date and time of most recent file request, which was generated using the interface of FIG. 8. The record count field includes a number of records obtained for a particular file. The obtained files are each associated with the requested data in that file from either the user directory or the collaborative platform. The report box 113 includes client user selectable option buttons 114, 115 below the listed files.

The client user selectable buttons include a load 114, normalize 115, main menu, and close buttons. The load button 114 can initiate loading of the files into an external database when the files are generated remotely and executed by the client. In a further embodiment, the files can be automatically loaded into the external database when a consultant directly executes the file commands at the client's place of business. The normalize button 115 initiates a comparison of the files with the custodian list to identify user names that correctly represent particular custodians. The mapping process performed by the normalize button is further discussed above with reference to FIG. 3 and below with reference to FIG. 10.

A summary report box 122, located below the file box 113, can include additional client user selectable option buttons, such as documents accessible by custodian 116, view result 117, documents authored 118, documents modified 119, document types 120, and document Web sites 121. These options can only be selected after the collection files have been loaded and mapping of the files with a custodian list is complete. As well, the summary report includes fields for client name and select folder location. The documents accessible by custodian button 116 allows a client user, such as the client or consultant, to obtain all documents accessible by one or more custodians. The custodians can be selected automatically or by the client user. The view result option 117 allows the client user to access and review the files previously generated without the need to wait for regeneration. In one embodiment, the view result option 117 provides the docs accessible by custodian report for review by the client user; however, other reports are possible. The documents ("docs") authored button 118 allows the client user to identify all documents authored by one or more custodians, while the docs modified button 119 provides all documents last modified by one or more custodians. The custodians can each be automatically selected or selected by the client user. The docs type button 120 provides all documents associated with a custodian that has a particular file extension, which can be selected automatically or by the client user. The docs Web site button 121 provides all documents associated with one or more Web sites that are related to one or more custodians. The reports can be provided to a client or exported to an external data storage in various formats to facilitate detailed analysis using applications such as Microsoft Excel, licensed by Microsoft Corporation, Redmond, Wash.

Upon obtaining a custodian list from the client user, the custodian names can be compared to data from the user directory to identify user names associated with the custodians. FIG. 10 is a screenshot 130 of a page 131 displaying results from mapping of the custodian names with the user reports. During normalization, the list of custodian names is compared with the collection files maintained by the user directory, such as "all users," to identify exact matches, partial matches, options, and custodian names with no matches. The normalization report includes columns for custodian name 132, as provided in the custodian list, exact matches 133, no matches 134, partial matches 135, and selection options 136. The exact match column 133 lists the user names that match the custodian names. The partial match column 135 lists user names, which partially match one or more custodian names. In one embodiment, the partial matches are based on a common last name. However, other partial search queries are possible, such as first name, middle name, or a portion of the last name, as well as other queries. Client users can utilize the selection column 136, which can include a dropdown menu to present possible options. Providing options allows for client review and selection when automation may not be possible. The no match column 134 lists those custodian names for which no exact matching user names or partial matching user names were identified. In a further embodiment, a creation date column and disabled column can provide additional relevant selection criteria, in addition to name similarities, and will be displayed on the drop-down in the selection column 136.

The normalization report is transmitted to the client to document the status of custodian and user account matching and to facilitate manual review during which further analysis of the custodian names and user names can be performed. For the partial matches, the client is able to review the partially matching user names, which are provided as options, and to select the correct option, if available. For example, the name "Ed Roland" is provided in the custodian list. The partial user name matches include "Mac Roland" and "ERoland." The client can select "ERoland" as the correct user name, which is then entered into the selected column. Additionally, the client can also review the custodian names for which no match was identified as an attempt to further locate the correct user name. For example, a search using last name is conducted for "Jane Cruz" and no matching user names are located. Upon review, the client may determine that the last name "Cruz" is Jane's married surname and that the user name is generating using her maiden surname. The client can then provide Jane's maiden surname, which is then used to identify the corresponding user name.

Figure 11:
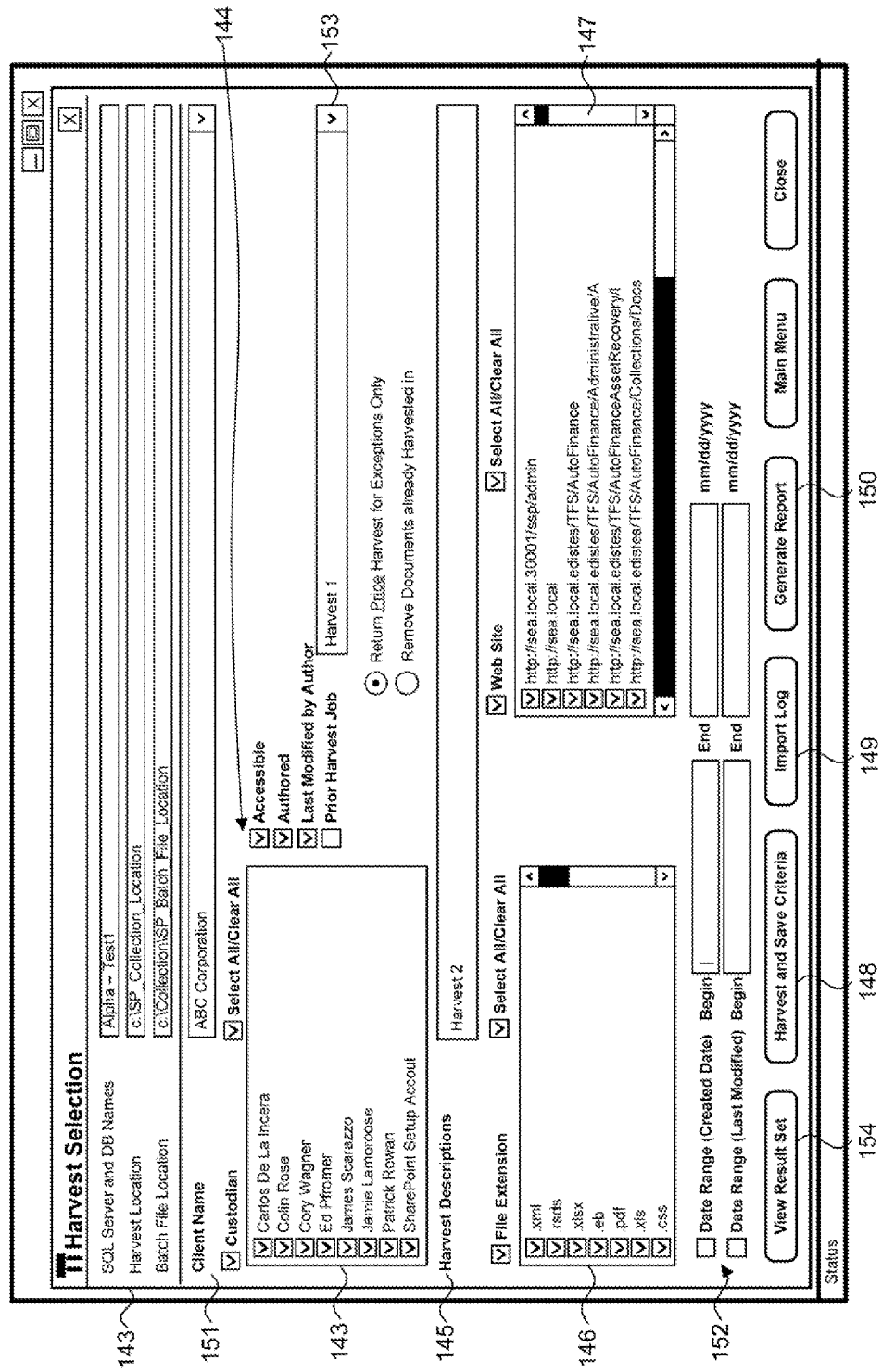
FIG. 11 is a screenshot for selecting harvest criteria.

Unique user identifiers are determined for each verified user name and can be used to identify documents associated with the custodian represented by that verified user name. User name identification is then expanded to identify security groups of which the custodian is a member. Criteria are defined and applied to the document list to identify documents for exporting outside the client network. FIG. 11 is a screenshot 140 showing, by way of example, an interface 141 for selecting harvest criteria. The criteria interface includes a data box 143 at the top of the page with fields for SQL server and database names, harvest location, and batch file location. A criteria box 151 is located underneath the data box 143 and can include selectable options for custodian 143, document access 144, file extension 146, Website 147, and date range 152, as well as a description for the harvest 145. An additional option 153 is provided to compare the current harvest to a prior harvest in order to reduce the repeated collection of documents already preserved. The custodian option 143 allows the client user to select particular custodians for accessing documents associated with those custodians. The client can also determine a level of access 144 between the selected custodians and the documents, including documents accessible, authored, or last modified by the selected custodians. Other levels of access are possible. In the file extension options box 146, one or more file types can be selected as criteria for the document search. Further, in the Website options box 147, one or more Web sites can be selected as criteria for conducting the document search. As well, a particular date range 152, which is based on the creation date or the last modification date of the documents, can be defined as additional criteria. The criteria interface also includes client user selectable buttons for viewing the results set 154, harvesting and saving the criteria 148, importing a quality control log 149, generating a report of the harvest 150, accessing the main menu, and closing the interface page.

Although the harvesting of documents by custodian is described above with reference to SharePoint and the Active Directory, other collaboration platforms and user directories are possible.

While the invention has been particularly shown and described as referenced to the embodiments thereof, those skilled in the art will understand that the foregoing and other changes in form and detail may be made therein without departing from the spirit and scope.

What is claimed is:

1. A system for harvesting electronic content by custodian, comprising:
a processor to execute the following:
a collaboration environment to maintain content associated with user names for one or more custodians;
a mapper to receive from a client user a custodian list comprising custodian names of at least a portion of the custodians, each custodian name comprising at least one of a full name, legal name, partial name, and nickname, to obtain an access report comprising the user names and associated unique identifiers for the custodians with access to the content within the collaboration environment, to compare the custodian names to the user names in the access report, to determine a similarity between at least one of the custodian names in the custodian list and one or more of the user names in the access report, and to identify for at least one of the custodians one or more of the user names that partially match the custodian name for that custodian based on the similarity as user name options;
a comparison module to select the user name option most similar to the custodian name for the at least one custodian and to compare the similarity of the most similar user name option to a confidence threshold;
an option module to, upon the confidence threshold being satisfied by the similarity of the most similar user name option, provide the most similar user name option as a user name suggestion for the at least one custodian to the client user;
a confirmation module to receive a confirmation of the user name suggestion being the user name for the at least one custodian from the client user;
a harvester to identify the content associated with the at least one custodian using the confirmed user name and to make a list of the identified content;
an exporting module to export the identified content to a storage external to the collaboration environment;
an application module to apply the list of the identified content to the external storage and to determine whether all of the identified content has been exported to the external storage; and
an identifying module to, upon the determination that at least some of the identified content has not been exported, identify and export the unexported content to the external storage.

2. A system according to claim 1, further comprising:
a group analyzer to identify one or more groups to which the at least one custodian belongs by mapping the custodian name for the at least one custodian with group access records each comprising a group name and group unique identifier and identifying the unique identifier associated with the groups to which the at least one custodian belongs.

3. A system according to claim 2, wherein the harvester module identifies content associated with the at least one custodian based on the groups to which the custodian belongs by comparing the group unique identifiers to the access reports, applying selection criteria to the identified content and selecting those contents that satisfy the criteria, and exporting the selected documents outside of the collaboration environment.

4. A system according to claim 1, wherein the user name options further comprise full matches with the custodian name, and no matches with the custodian name.

5. A system according to claim 1, wherein the unique identifier comprises a global uniform identifier.

6. A method for harvesting electronic content by custodian, comprising the steps of:
   maintaining in a collaboration environment, content associated with user names for one or more custodians;
   receiving from a client user a custodian list comprising custodian names of at least a portion of the custodians, each custodian name comprising at least one of a full name, legal name, partial name, and nickname;
   obtaining an access report comprising the user names and associated unique identifiers for the custodians with access to the content within the collaboration environment;
   comparing the custodian names to the user names in the access report and determining a similarity between at least one of the custodian names in the custodian list and one or more of the user names in the access report;
   identifying for at least one of the custodians one or more of the user names that partially match the custodian name for that custodian based on the similarity as user name options;
   selecting the user name option most similar to the custodian name for the at least one custodian and comparing the similarity of the most similar user name option to a confidence threshold;
   upon the confidence threshold being satisfied by the similarity of the most similar user name option, providing the most similar user name option as a user name suggestion for the at least one custodian to the client user;
   receiving a confirmation of the user name suggestion being the user name for the at least one custodian from the client user;
   identifying the content associated with the at least one custodian using the confirmed user name and making a list of the identified content;
   exporting the identified content to a storage external to the collaboration environment;
   applying the list of the identified content to the external storage and determining whether all of the identified content has been exported to the external storage; and
   upon determining that at least some of the identified content has not been exported, identifying and exporting the unexported content to the external storage, wherein the steps are performed by computer hardware.

7. A method according to claim 6, further comprising:
   identifying one or more groups to which the at least one custodian belongs, comprising:
   mapping the custodian name for the at least one custodian with group access records each comprising a group name and group unique identifier; and
   identifying the unique identifier associated with the groups to which the at least one custodian belongs.

8. A method according to claim 7, further comprising:
   identifying content associated with the at least one custodian based on the groups to which the custodian belongs, comprising:
   comparing the group unique identifiers to the access reports;
   applying selection criteria to the identified content and selecting those contents that satisfy the criteria; and
   exporting the selected documents outside of the collaboration environment.

9. A method according to claim 6, further comprising:
   wherein the user name options further comprise full matches with the custodian name, and no matches with the custodian name.

10. A method according to claim 6, wherein the unique identifier comprises a global uniform identifier.

11. A system for identifying documents by custodian, comprising:
    a processor to execute the following:
    a collaboration environment comprising documents;
    a receipt module to receive from a client user one or more custodian names, each custodian name associated with one of a plurality of custodians;
    a custodian identifier to obtain collection data comprising access lists with one or more of user names for the custodians, unique custodian identifiers for the custodians, membership information for one or more groups of the custodians, the membership information comprising at least one of the user name and unique custodian identifier for each custodian that is a member of one of the groups, and unique group identifiers for the one or more groups and to determine at least one of the user name and unique custodian identifier for at least one of the custodians by comparing the custodian name associated with the at least one custodian with the collection data, comprising:
       a similarity module to determine a similarity of one or more of the user names to the custodian name associated with the at least one custodian and to identify those of the user names partially matching the custodian name associated with the at least one custodian as user name options based on the similarity;
       a comparison module to select the user name option most similar to the custodian name associated with the at least one custodian and to compare the similarity of the most similar user name option to a confidence threshold;
       an option module to, upon the confidence threshold being satisfied by the similarity of the most similar user name option, provide the most similar user name option as a user name suggestion for the at least one custodian to the client user; and
       a confirmation module to receive a confirmation of the user name suggestion being the user name for the at least one custodian from the client user;
    a group identifier to identify groups to which the at least one custodian belongs by comparing at least one of the confirmed user name and unique custodian identifier for the at least one custodian to the group membership information in the collection data, and to determine the unique group identifier for each group to which the at least one custodian belongs;
    a mapper to apply at least one of the confirmed user name for the at least one custodian, unique custodian identifier for the at least one custodian, and the unique group identifier of at least one of the groups to which the at least one custodian belongs to the collaboration environment to identify the documents associated with the at least one custodian;
    a harvester to apply selection criteria to the identified documents, to select those documents that satisfy the criteria, to make a list of the selected documents, and to export the selected documents into a storage outside of the collaboration environment;
    an application module to apply the list of the selected documents to the outside storage and to determine whether all of the selected documents have been exported to the outside storage; and an identifying module to, upon the determination that one or more selected documents have not been exported, identify and export the unexported documents to the outside storage.

12. A system according to claim 11, wherein the selection criteria comprise at least one of file extension, Website, documents authored, documents modified, and documents accessible.

13. A system according to claim 11, further comprising:

a duplicate module to compare the documents that satisfy the selection criteria with previously exported documents, to identify the documents that match the previously exported documents as duplicates, and to remove the duplicates from the documents that match the selection criteria prior to exporting.

14. A system according to claim 11, wherein the unique identifier comprises a global uniform identifier.

15. A method for identifying documents by custodian, comprising the steps of:

accessing a collaboration environment comprising documents;

receiving from a client user one or more custodian names, each custodian name associated with one of a plurality of custodians;

obtaining collection data comprising access lists with one or more of user names for the custodians, unique custodian identifiers for the custodians, membership information for one or more groups of the custodians, the membership information comprising at least one of a user name and unique custodian identifier for each custodian that is a member of one of the groups, and unique group identifiers for the one or more groups;

determining at least one of the user name and unique custodian identifier for at least one of the custodians by comparing the custodian name associated with the at least one custodian with the collection data, comprising:

determining a similarity of one or more of the user names to the custodian name associated with the at least one custodian and identifying those of the user names partially matching the custodian name associated with the at least one custodian as user name options based on the similarity;

selecting the user name option most similar to the custodian name associated with the at least one custodian and comparing the similarity of the most similar user name option to a confidence threshold;

upon the confidence threshold being satisfied by the similarity of the most similar user name option, providing the most similar user name option as a user name suggestion for the at least one custodian to the client user; and receiving a confirmation of the user name suggestion being the user name associated with the at least one custodian from the client user;

identifying groups to which the at least one custodian belongs by comparing at least one of the confirmed user name and unique custodian identifier for the at least one custodian to the membership information in the collection data, and determining the unique group identifier for each group to which the at least one custodian belongs;

applying at least one of the confirmed user name for the at least one custodian, unique custodian identifier for the at least one custodian, and unique group identifier of at least one of the groups to which the at least one custodian belongs to the collaboration environment to identify the documents associated with the at least one custodian;

applying selection criteria to the identified documents and selecting those documents that satisfy the criteria and making a list of the selected documents;

exporting the selected documents into a storage outside of the collaboration environment;

applying the list of the selected documents to the outside storage and determining whether all of the selected documents have been exported; and upon the determination that one or more selected documents have not been exported, identifying and exporting the unexported documents to the outside storage, wherein the steps are performed by computer hardware.

16. A method according to claim 15, wherein the selection criteria comprise at least one of file extension, Website, documents authored, documents modified, and documents accessible.

17. A method according to claim 15, further comprising:

comparing the documents that satisfy the selection criteria with previously exported documents and identifying the documents that match the previously exported documents as duplicates;

removing the duplicates from the documents that match the selection criteria prior to exporting.

18. A method according to claim 15, wherein the unique identifier comprises a global uniform identifier.

* * * * *